(12) United States Patent
Lee

(10) Patent No.: US 12,271,205 B2
(45) Date of Patent: Apr. 8, 2025

(54) IN-PORT OBJECT OCCUPIED SPACE RECOGNITION APPARATUS

(71) Applicant: TOTAL SOFT BANK LTD., Busan (KR)

(72) Inventor: Hoon Lee, Busan (KR)

(73) Assignee: TOTAL SOFT BANK LTD., Busan (KR)

( * ) Notice: Subject to any disclaimer, the term of this patent is extended or adjusted under 35 U.S.C. 154(b) by 0 days.

(21) Appl. No.: 18/522,529

(22) Filed: Nov. 29, 2023

(65) Prior Publication Data

US 2024/0176354 A1   May 30, 2024

(30) Foreign Application Priority Data

Nov. 30, 2022   (KR) .................. 10-2022-0163730

(51) Int. Cl.
   *G05D 1/00*   (2024.01)

(52) U.S. Cl.
   CPC .......... *G05D 1/0246* (2013.01); *G05D 1/0289* (2013.01)

(58) Field of Classification Search
   CPC ........................... G05D 1/0246; G05D 1/0289
   See application file for complete search history.

(56) References Cited

U.S. PATENT DOCUMENTS

| | | | |
|---|---|---|---|
| 2013/0128050 A1* | 5/2013 | Aghdasi | G06T 7/292 348/158 |
| 2017/0367252 A1* | 12/2017 | Sakaguchi | A01B 69/008 |
| 2019/0367030 A1* | 12/2019 | Tanaka | B60W 30/18036 |
| 2020/0156627 A1* | 5/2020 | Wieschemann | B60W 30/16 |
| 2022/0383749 A1* | 12/2022 | Ishikawa | B60W 40/04 |

FOREIGN PATENT DOCUMENTS

| | | | |
|---|---|---|---|
| JP | 2020193503 A | * 12/2020 | |
| KR | 10-1016071 B1 | 2/2011 | |
| KR | 10-2017-0101555 A | 9/2017 | |
| KR | 10-2021-0051601 A | 5/2021 | |
| KR | 10-2022-0032681 A | 3/2022 | |
| KR | 2022032681 A | * 3/2022 | ............... F21L 4/00 |
| KR | 2022145016 A | * 10/2022 | |
| WO | WO-2019015495 A1 | * 1/2019 | ............... E04H 6/18 |

OTHER PUBLICATIONS

English Translation of JP-2020193503-A (Year: 2024).*
English Translation of KR-2022145016-A (Year: 2024).*
English Translation of KR-2022032681-A (Year: 2024).*
English Translation of WO-2019015495-A1 (Year: 2024).*

* cited by examiner

*Primary Examiner* — Jess Whittington
*Assistant Examiner* — Shahira Baajour
(74) *Attorney, Agent, or Firm* — Bridgeway IP Law Group, PLLC; Jihun Kim

(57) ABSTRACT

An occupied space recognition apparatus for recognizing an occupied space of an object in a port, includes an input unit that receives an image photographed from an external photographing unit, an object recognition unit that recognizes the object based on the image, a position acquisition unit that acquires position coordinates of the object for each of a plurality of frames of the image, and an occupied space recognition unit that recognizes an occupied space of the object based on the position coordinates.

3 Claims, 6 Drawing Sheets

IN-PORT OBJECT OCCUPIED SPACE RECOGNITION APPARATUS

CROSS-REFERENCE TO RELATED APPLICATIONS

This application claims the priority of Korean Patent Application No. 10-2022-0163730 filed on Nov. 30, 2022, in the Korean Intellectual Property Office, the disclosure of which is incorporated herein by reference in its entirety.

BACKGROUND OF THE INVENTION

Field of the Invention

The present disclosure relates to an apparatus for recognizing an occupied space of an object driving in a port.

This research was supported by Korea Institute of Marine Science & Technology Promotion (KIMST) funded by the Ministry of Oceans and Fisheries (20220583).

Background of the Related Art

A yard tractor is a tractor that tows a yard chassis within a container terminal to transport and load containers between a dock and a container yard.

In recent years, a connected autonomous yard tractor (CAYT), which can automatically transport containers to a desired position in an unmanned manner by applying autonomous driving technology to a yard tractor, has been developed.

At present, automatic monitoring using cameras is being carried out in the terminal.

However, automatic monitoring using cameras is limited to technologies for recognizing license plates of external vehicles, and is insufficient to recognize the positions of other objects for the driving of an autonomous yard tractor.

Accordingly, a technology that can recognize an occupied space of the autonomous yard tractor and the external vehicle within a port is needed.

In addition, a technology that can determine a loading and unloading work position of the autonomous yard tractor through the occupied space is needed.

SUMMARY OF THE INVENTION

An aspect to be solved by an embodiment of the present disclosure includes recognizing an occupied space of an autonomous yard tractor and an external vehicle within a port.

Another aspect to be solved by an embodiment of the present disclosure includes determining a loading and unloading work position of the autonomous yard tractor through the occupied space.

Technical problems to be solved in the present disclosure may not be limited to the above-described problems and other technical problems, which are not mentioned herein, will definitely be understood by those skilled in the art from the following description.

In order to solve the foregoing problems, an occupied space recognition apparatus for recognizing an occupied space of an object in a port according to an aspect of the present disclosure may include an input unit that receives an image photographed from an external photographing unit, an object recognition unit that recognizes the object based on the image, a position acquisition unit that acquires position coordinates of the object for each of a plurality of frames of the image, and an occupied space recognition unit that recognizes an occupied space of the object based on the position coordinates.

Here, the object may include an autonomous yard tractor and an external vehicle.

Here, the occupied space recognition unit may recognize a change in the position of the object and an occupied area of the object based on the position coordinates.

In addition, the apparatus may further include a work position determination unit that determines a loading and unloading work position of an autonomous yard tractor based on the occupied space.

Here, the work position determination unit may include a loading and unloading safety distance determination unit that determines whether a loading and unloading safety distance between the object and the autonomous yard tractor is secured based on the occupied space.

Here, the loading and unloading safety distance determination unit may calculate an expected safety distance value between a first occupied space of a previously stopped object and a second occupied space of the autonomous yard tractor according to the loading and unloading work position, and compare the expected safety distance value with a preset safety distance value to determine whether the loading and unloading safety distance is secured.

Here, the loading and unloading safety distance determination unit may predict the coordinates of the second occupied space based on the coordinates of the first occupied space and a longitudinal length of the autonomous yard tractor.

Here, the expected safety distance may be calculated by adding up a longitudinal length, a forward margin, and a rear margin of the autonomous yard tractor scheduled to be loaded and unloaded at the loading and unloading work position.

Here, the work position determination unit may search for, when the loading and unloading safety distance is not secured, a candidate loading and unloading work position adjacent to the loading and unloading work position.

As described above, according to embodiments and various aspects of the present disclosure, an occupied space of an autonomous yard tractor and an external vehicle within a port may be recognized based on an image.

In addition, a loading and unloading work position of the autonomous yard tractor may be determined by determining whether a loading and unloading safely distance is secured.

It is to be understood that the effects of the present disclosure are not limited to the foregoing effects, and include all effects that may be deduced from the features described in the detailed description of the invention or the claims.

DESCRIPTION OF SYMBOLS

Figure 1:
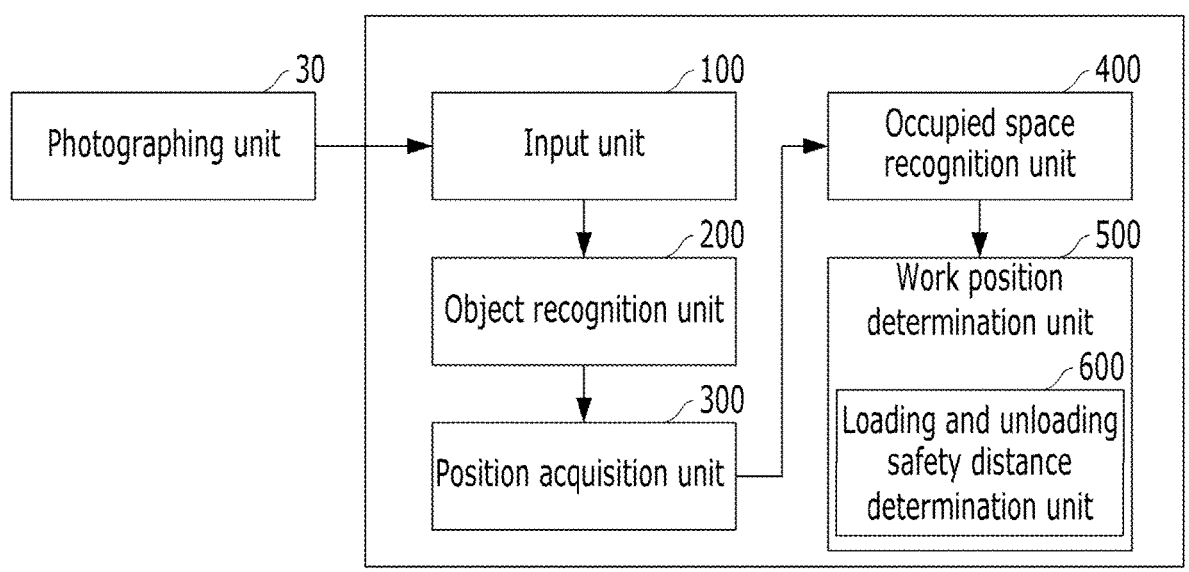
FIG. 1 is a block diagram showing an in-port object occupied space recognition apparatus according to an embodiment of the present disclosure.

10: In-port object occupied space recognition apparatus
100: Input unit
200: Object recognition unit
300: Position acquisition unit
400: Occupied space recognition unit
500: Work position determination unit

DETAILED DESCRIPTION OF THE PREFERRED EMBODIMENT

Hereinafter, the present disclosure will be described with reference to the accompanying drawings. However, the present disclosure may be implemented in various different forms, and therefore, is not limited to the embodiments described herein. In order to clearly describe the present disclosure, parts not related to the description are omitted, and like reference numerals designate like parts throughout the specification.

Throughout the specification, in case where a portion is "connected to (coupled to, in contact with, in combination with" the other portion, it may include a case of being "indirectly connected to" the other portion by interposing another member therebetween as well as a case of being "directly connected to" the other portion. Furthermore, when a portion may "include" a certain element, unless specified otherwise, it may not be construed to exclude another element but may be construed to further include other elements.

It should be noted that terms used herein are merely used to describe specific embodiments, but not to limit the present disclosure. As used herein, the singular forms are intended to include the plural forms as well, unless the context clearly indicates otherwise. Terms "include" or "have" used herein should be understood that they are intended to indicate the presence of a feature, a number, a step, an element, a component or a combination thereof disclosed in the specification, and it may also be understood that the presence or additional possibility of one or more other features, numbers, steps, elements, components or combinations thereof are not excluded in advance.

Hereinafter, embodiments of the present disclosure will be described in detail with reference to the accompanying drawings.

An embodiment of the present disclosure relates to an in-port object occupied space recognition apparatus.

FIG. 1 is a block diagram showing an in-port object occupied space recognition apparatus according to an embodiment of the present disclosure.

Referring to FIG. 1, an in-port object occupied space recognition apparatus 10 according to an embodiment of the present disclosure includes an input unit 100, an object recognition unit 200, a position acquisition unit 300, an occupied space recognition unit 400, and a work position determination unit 500.

The in-port object occupied space recognition apparatus 10 according to an embodiment of the present disclosure is an apparatus for recognizing an occupied space of an autonomous yard tractor and an external vehicle that are driving in a port, and determining a loading and unloading work position of the autonomous yard tractor through the occupied space.

Here, the autonomous yard tractor may include a connected autonomous yard tractor (CAYT), and unloading equipment may include a yard crane (YC).

The input unit 100 receives an image photographed from an external photographing unit 30.

Here, the external photographing unit 30 may be located in a port, and may be implemented as a CCTV camera, surveillance camera, and the like that can photograph an image to monitor a moving object having a predetermined size.

The object recognition unit 200 recognizes an object based on an image.

Here, the object may include an autonomous yard tractor and an external vehicle, and may include driving objects whose positions must be considered for loading and unloading work of the autonomous yard tractor in a port.

In an embodiment of the present disclosure, an object recognition and tracking process may use various known methods. For example, general object recognition may be obtained from a subtraction operation between an image of a previous frame and an image of a new frame, and tracking of the detected object may also use a known algorithm.

The position acquisition unit 300 acquires the position coordinates of an object for each of a plurality of frames of the image.

The occupied space recognition unit 400 recognizes an occupied space of an object based on position coordinates.

Specifically, the occupied space of the object may be represented as an area containing position coordinate values, and the occupied space recognition unit 400 may recognize a change in the position of the object and an occupied area of the object based on the position coordinates.

The work position determination unit 500 may determine a loading and unloading work position of the autonomous yard tractor based on the occupied space.

In an embodiment of the present disclosure, the work position determination unit 500 determines whether a loading and unloading safety distance is secured from the occupied space of the other vehicle to determine whether loading and unloading work of the autonomous yard tractor is allowed.

If the loading and unloading safety distance is not secured, then the work position determination unit 500 may search for a candidate loading and unloading work position adjacent to the loading and unloading work position to select an area where a loading and unloading work position is allowed.

A loading and unloading safety distance determination unit 600 determines whether a loading and unloading safety distance between an object and the autonomous yard tractor is secured based on the occupied space.

Specifically, the loading and unloading safety distance determination unit 600 may calculate an expected safety distance value between a first occupied space of a previously stopped object and a second occupied space of the autonomous yard tractor according to the loading and unloading work position, and compare the expected safety distance value with a preset safety distance value to determine whether the loading and unloading safety distance is secured.

The occupied space and the loading and unloading safety distance recognized by the in-port object occupied space recognition apparatus according to an embodiment of the present disclosure will be described in detail in FIG. 4 below.

An execution step that is performed by the in-port object occupied space recognition apparatus according to an embodiment of the present disclosure may be implemented in each processor or implemented in a single integrated processor.

Figure 2:
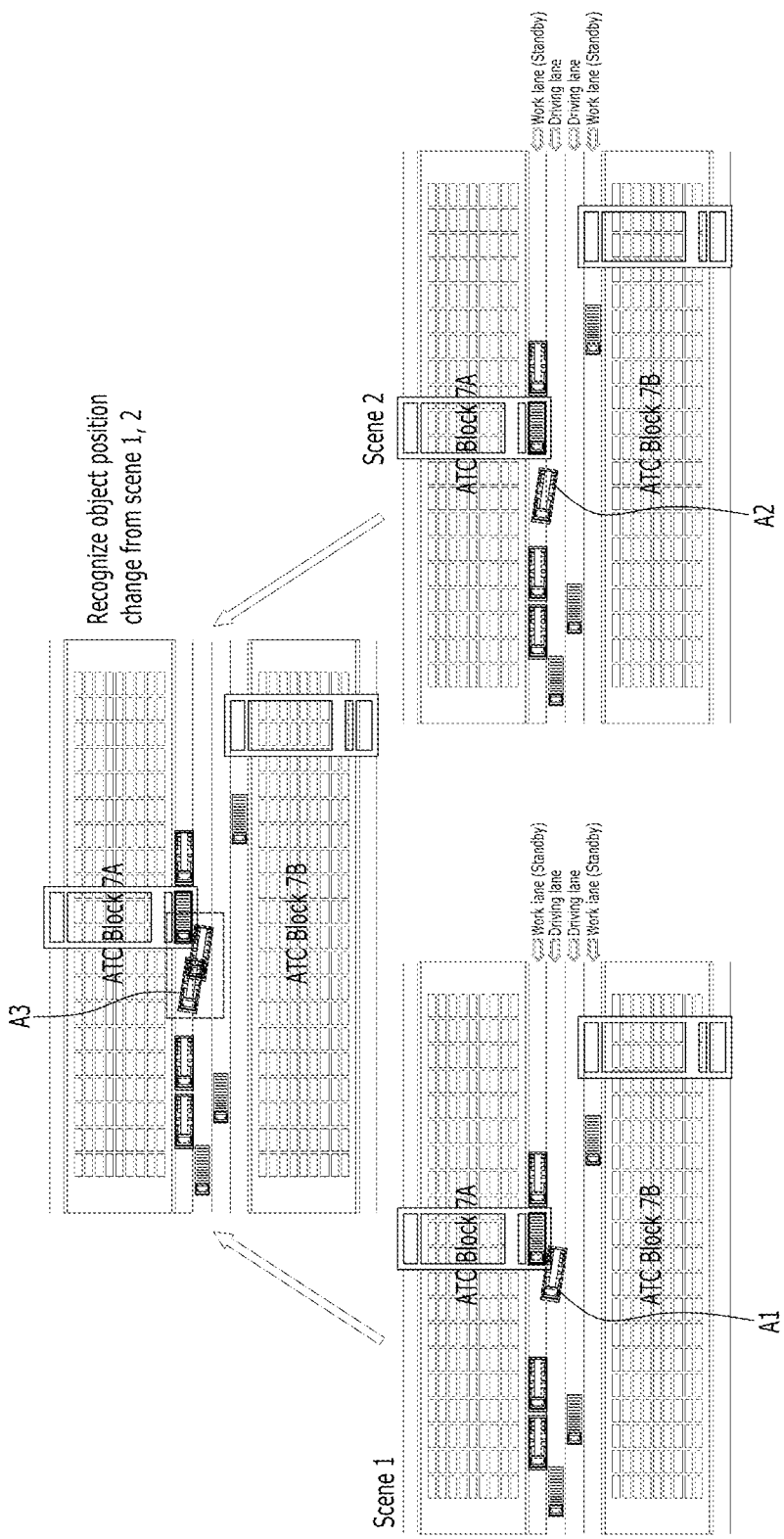
FIG. 2 is a diagram showing an example of a process in which an in-port object occupied space recognition apparatus according to an embodiment of the present disclosure recognizes an object.

FIG. 2 is a diagram showing an example of a process in which an in-port object occupied space recognition apparatus according to an embodiment of the present disclosure recognizes an object.

The in-port object occupied space recognition apparatus according to an embodiment of the present disclosure may recognize an occupied area, an occupied position of the object, an ID of the object, and a change in the position of the object.

In addition, the recognized information may be used to identify a distance between occupied objects and whether a vehicle entry space is secured, identify an object subject to a follow-up measure, and identify movement due to entry and exit of an object by a change in the position of the object.

Referring to FIG. 2, the object recognition unit 200 of the in-port object occupied space recognition apparatus according to an embodiment of the present disclosure recognizes an object based on an image.

Here, the object may include an autonomous yard tractor and an external vehicle, and may include driving objects whose positions must be considered for loading and unloading work of the autonomous yard tractor in a port.

According to an embodiment of the present disclosure, an autonomous yard tractor and an external vehicle may be recognized as different objects.

In an embodiment of the present disclosure, an object recognition and tracking process may use various known methods. For example, general object recognition may be obtained from a subtraction operation between an image of a previous frame and an image of a new frame, and tracking of the detected object may also use a known algorithm.

Furthermore, the position acquisition unit 300 acquires the position coordinates of an object for each of a plurality of frames of the image.

For example, a first position (A1) of the object may be acquired in a first frame (scene 1), and a second position (A2) of the object may be obtained in a second frame (scene 2).

Then, the occupied space recognition unit 400 recognizes an occupied space of an object based on position coordinates.

Specifically, the occupied space of the object may be represented as an area containing position coordinate values, and the occupied space recognition unit 400 may recognize a change in the position of the object and an occupied area of the object based on the position coordinates.

For example, the first position (A1) of the object in the first frame (scene 1) and the second position (A2) of the object in the second frame (scene 2) may be acquired, and then a change from the first position (A1) to the second position (A2) of the object may be recognized.

Additionally, an occupied area (A3), which is an area occupied by an object to change from the first position (A1) to the second position (A2), may be recognized.

Figure 3:
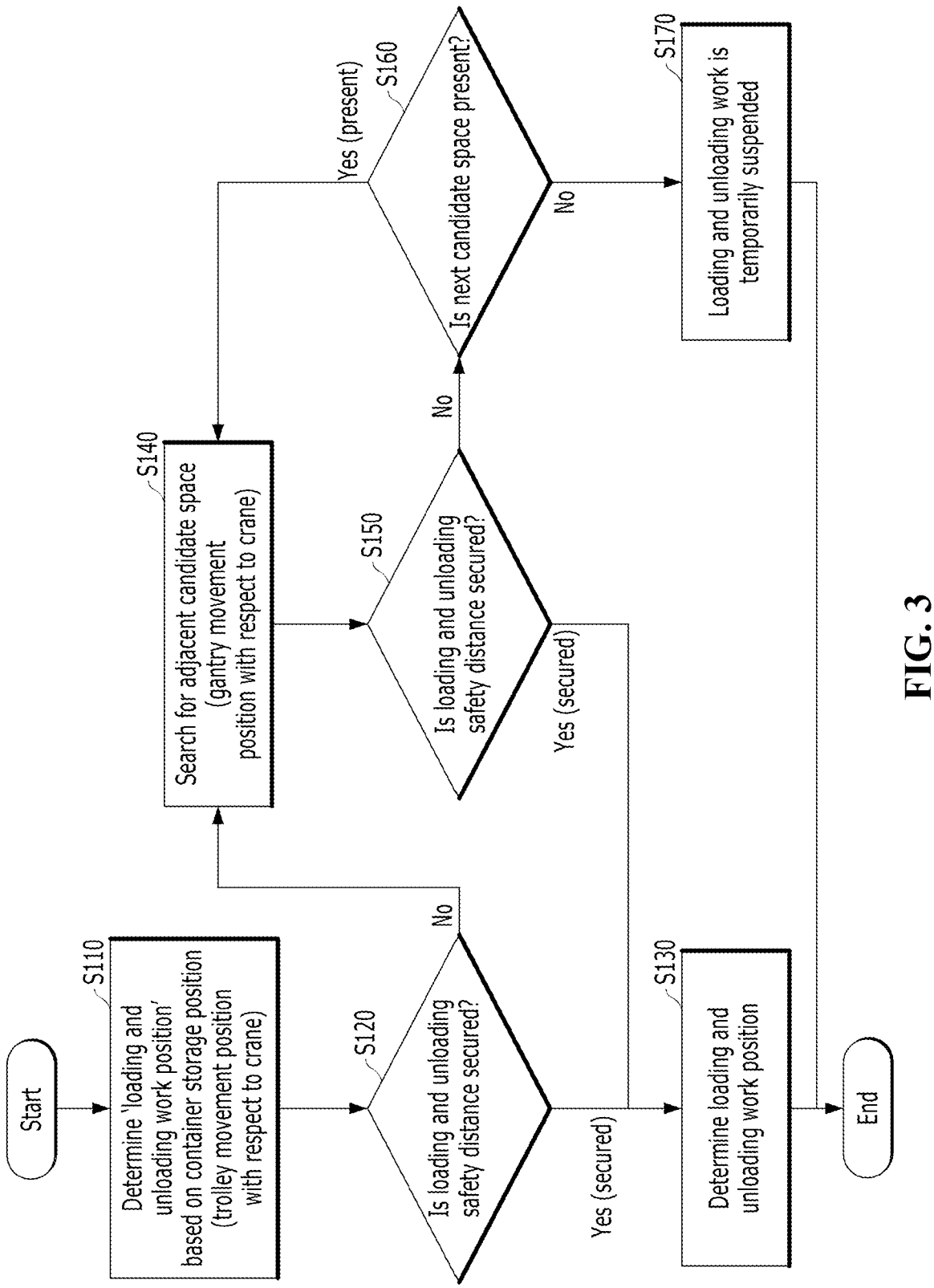
FIG. 3 is a flowchart showing a loading and unloading work position determination method performed in an in-port object occupied space recognition apparatus according to an embodiment of the present disclosure.

FIG. 3 is a flowchart showing a loading and unloading work position determination method performed in an in-port object occupied space recognition apparatus according to an embodiment of the present disclosure.

Referring to FIG. 3, the occupied space recognition unit 400 of the in-port object occupied space recognition apparatus according to an embodiment of the present disclosure determines a loading and unloading work position based on a container storage position in step S110.

Here, the loading and unloading work position may consider a movement position of a crane reference trolley (Y-axis).

In step S120, it is determined whether the loading and unloading safety distance is secured, and when the safety distance is secured, the corresponding position is determined as the loading and unloading work position in step S130.

In an embodiment of the present disclosure, the loading and unloading safety distance determination unit 600 determines whether a loading and unloading safety distance between an object and the autonomous yard tractor is secured based on the occupied space.

If the safety distance is not secured, then the occupied space recognition unit 400 searches for an adjacent candidate space in step S140.

Here, the adjacent candidate space may consider a movement position of a crane reference gantry (X-axis).

In step S150, it is determined whether the loading and unloading safety distance is secured, and when the safety distance is secured, the corresponding position is determined as the loading and unloading work position in step S130.

If the safety distance is not secured, then the occupied space recognition unit 400 checks whether a next candidate space is present in step S160, and when the candidate space is not present, loading and unloading work is temporarily suspended in step S170.

Figure 4:
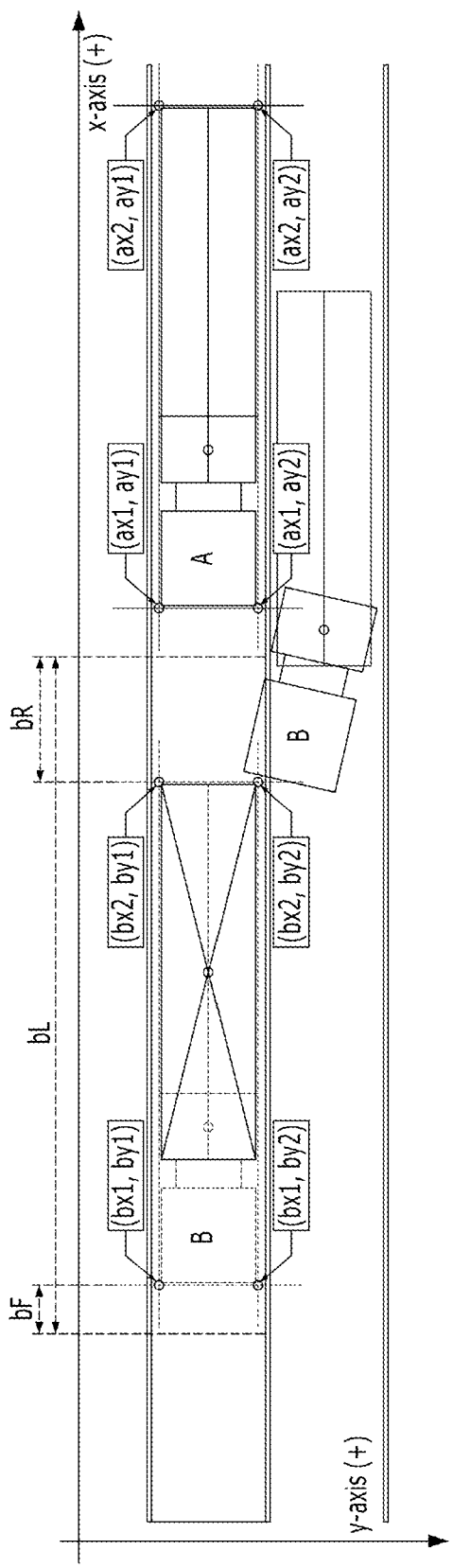
FIG. 4 is a diagram for explaining an occupied space and a loading and unloading safety distance recognized by an in-port object occupied space recognition apparatus according to an embodiment of the present disclosure.

FIG. 4 is a diagram for explaining an occupied space and a loading and unloading safety distance recognized by an in-port object occupied space recognition apparatus according to an embodiment of the present disclosure.

The loading and unloading safety distance determination unit 600 according to an embodiment of the present disclosure determines whether a loading and unloading safety distance between an object and the autonomous yard tractor is secured based on the occupied space.

Specifically, the loading and unloading safety distance determination unit 600 may calculate an expected safety distance value between a first occupied space of a previously stopped object and a second occupied space of the autonomous yard tractor according to the loading and unloading work position, and compare the expected safety distance value with a preset safety distance value to determine whether the loading and unloading safety distance is secured.

FIG. 4 shows an example of a situation in which vehicle B passes vehicle A and tries to stop at position B (dotted line area) while vehicle A is stopped first, wherein the vehicle A in FIG. 4 is an object that has already stopped, and the vehicle B may be an autonomous yard tractor scheduled to be loaded and unloaded at a loading and unloading work position.

As shown in FIG. 4, the occupied space recognition unit may recognize an occupied space according to the position coordinates of the vehicle A, and the position coordinates of the vehicle B denote an occupied space predicted according to the loading and unloading work position.

The loading and unloading safety distance determination unit according to an embodiment of the present disclosure may predict the coordinates of the second occupied space based on the coordinates of the first occupied space and a longitudinal length of the autonomous yard tractor.

Current occupied space of vehicle A={(ax1, ay1), (ax2, ay1), (ax2, ay2), (ax1, ay2)}

Planned occupied space of vehicle B={(bx1, by1), (bx2, by1), (bx2, by2), (bx1, by2)}

The loading and unloading safety distance determination unit 600 according to an embodiment of the present disclosure may add up the longitudinal length, forward margin (bF), and rear margin (bR) of the autonomous yard tractor scheduled to be loaded and unloaded at the loading and unloading work position to calculate an expected safety distance (bL).

In addition, in the embodiment of the present disclosure, the preset safety distance value denotes a longitudinal distance value of the loading and unloading work position where actual loading and unloading is allowed.

Meanwhile, the loading and unloading safety distance determination unit determines and obtains a necessary space in a longitudinal direction, which is required based on a target position (the vehicle B in a dotted line) with respect to the vehicle B (solid line).

Referring to FIG. 4, bx2 is a position obtained by adding or subtracting a forward margin and a backward margin with respect to ax1.

bx1 is a position obtained by adding or subtracting a total length (CL) of a vehicle with respect to bx2.

Through this, it may be possible to identify a longitudinal space (bL) required for entry and exit of a vehicle before the vehicle arrives, thereby preventing a delay during the entry of the vehicle.

If the expected safety distance (bL) is greater than a longitudinal distance value of the loading and unloading work position, then it may be determined that the loading and unloading safety distance is not secured, and if the expected safety distance (bL) is less than the longitudinal distance value of the loading and unloading work position, then it may be determined that the loading and unloading safety distance is secured.

Figure 5:
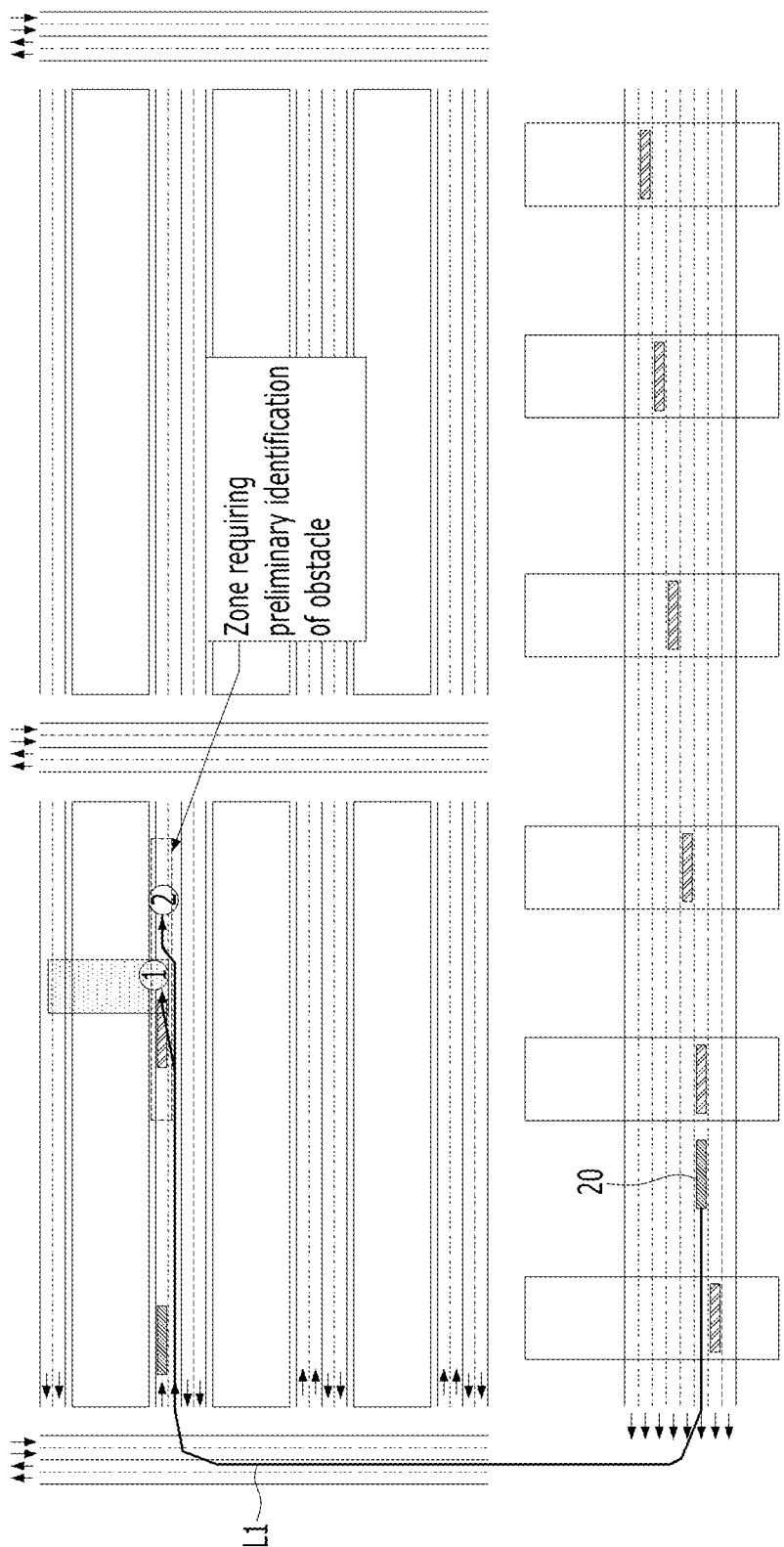
FIG. 5 is a diagram showing an example of a zone that requires preliminary identification of obstacles by an in-port object occupied space recognition apparatus according to an embodiment of the present disclosure.

FIG. 5 is a diagram showing an example of a zone that requires preliminary identification of obstacles by an in-port object occupied space recognition apparatus according to an embodiment of the present disclosure.

The in-port object occupied space recognition apparatus according to an embodiment of the present disclosure may determine a stop position of the yard tractor based on a driving path where container unloading (loading, unloading) is allowed based on unloading equipment (RMG, RTG).

For example, computer vision technology may be used to determine a space required for entry and exit of a yard tractor using data collected from image collection devices (e.g. camera, lidar, etc.) attached to unloading equipment.

Referring to FIG. 5, an error situation may be predicted using an image collection device attached to unloading equipment.

For example, an error situation may include a case where an obstacle is located on an initial movement path, and thus an autonomous yard tractor 20 is unable to stop within a correct position range of the destination due to a front or rear obstacle during a process of changing lanes.

In addition, the error situation may include a case where an obstacle is located in a work section and the vehicle is unable to stop at a correct position due to the obstacle within a destination range.

Accordingly, when an obstacle is located in a first work section, a plurality of candidate areas adjacent to the first work section are searched, and then a second work section is selected from among the plurality of candidate areas in consideration of movement time and cost.

Figure 6:
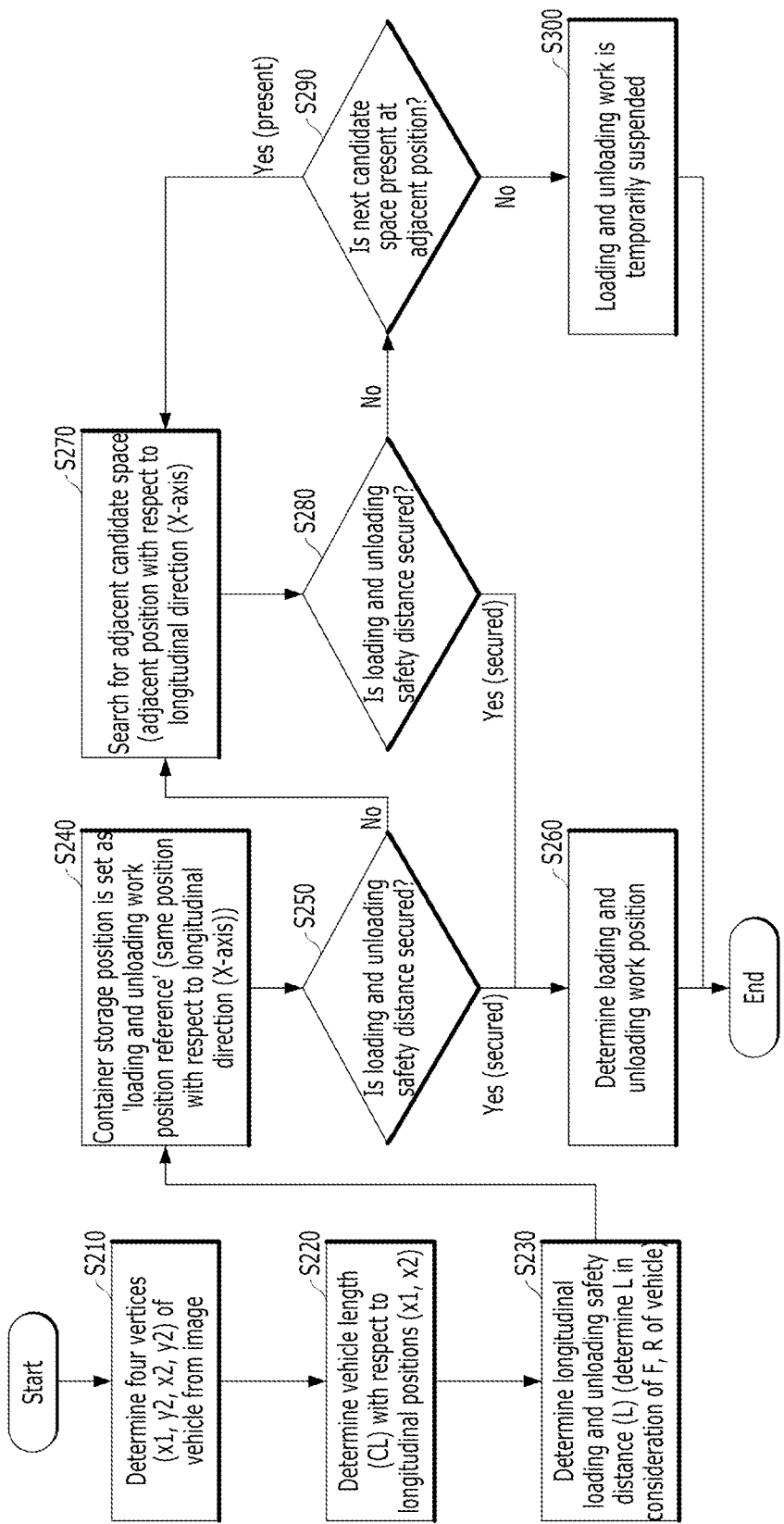
FIG. 6 is a flowchart showing a loading and unloading safety distance determination method performed in an in-port object occupied space recognition apparatus according to an embodiment of the present disclosure.

FIG. 6 is a flowchart showing a loading and unloading safety distance determination method performed in an in-port object occupied space recognition apparatus according to an embodiment of the present disclosure.

Referring to FIG. 6, the in-port object occupied space recognition apparatus according to an embodiment of the present disclosure determines four vertices (x1, y2, x2, y2) of a vehicle from an image in step S210, and determines a vehicle length (CL) with respect to longitudinal positions (x1, x2) in step S220.

Then, as shown in FIG. 4, a longitudinal loading and unloading safety distance (L) is determined in step S230, and a container storage position is set as 'a loading and unloading work position reference' in step S240.

After checking whether a loading and unloading safety distance is secured in step S250, when the loading and unloading safety distance is secured, the loading and unloading work position is determined in step S260.

If the loading and unloading safety distance is not secured, then adjacent candidate spaces are searched in step S270, and it is checked whether the loading and unloading safety distance is secured in step S280.

If the loading and unloading safety distance is secured, then the loading and unloading work position is determined in step S260.

If the loading and unloading safety distance is not secured, then whether a next candidate space is present at an adjacent position is checked in step S290, and when the candidate space is not present, loading and unloading work is temporarily suspended in step S300.

According to an embodiment of the present disclosure, there is provided a computer-readable recording medium on which a program for performing on a computer is recorded, wherein the program performs an operation display method that is carried out on an operation display apparatus of an autonomous yard tractor.

The computer-readable recording medium may include program instructions, data files, data structures, and the like, alone or in combination thereof. The program instructions recorded in the recording medium may be designed and configured especially for the present disclosure or may be known to and used by those skilled in computer software fields. Examples of the computer-readable recording medium include magnetic media such as hard disks, floppy disks, and magnetic tapes, optical media such as compact disk-read only memory (CD-ROM) and digital versatile disks (DVDs), magneto-optical media such as floptical disks, and hardware devices such as read-only memory (ROM), random access memory (RAM), and flash memory, which are specially configured to store and execute program instructions. Examples of the program instructions include not only machine language codes created by a compiler or the like, but also high-level language codes that can be executed by a computer using an interpreter or the like. The hardware devices may be configured to operate as one or more software modules in order to perform the operation of the present disclosure, and vice versa.

The foregoing description of the present disclosure is for illustrative purposes, but it will be apparent to those skilled in the art to which the invention pertains that the invention can be easily modified in other specific forms without departing from the technical concept and essential characteristics thereof. Therefore, it should be understood that embodiments described above are merely illustrative but not restrictive in all aspects. For example, each element described as a single entity may be distributed and implemented, and likewise, elements described as being distributed may also be implemented in a combined manner.

The scope of the present disclosure is defined by the appended claims, and all changes or modifications derived from the meaning and range of the claims and equivalents thereof should be construed to be embraced by the scope of the present disclosure.

What is claimed is:

1. An apparatus for recognizing an occupied space of an autonomous yard tractor in a port, the apparatus comprising:
at least one processor configured to:
receive an image photographed from an external photographing device;
detect the autonomous yard tractor and a stationary object based on the image;
acquire position coordinates of the autonomous yard tractor and position coordinates of the stationary object for the image;
recognize the occupied space of the autonomous yard tractor based on the position coordinates of the autonomous yard tractor and an occupied space of the stationary object based on the position coordinates of the stationary object, wherein the stationary object is an external vehicle, and wherein the occupied space of the autonomous yard tractor comprises an area occupied by a container towed by the autonomous yard tractor;
determine a loading and unloading work position of the autonomous yard tractor as a loading and unloading safety distance between the autonomous yard tractor and the stationary object is secured when an expected safety distance between a first occupied space of the stationary object and a second occupied space of the autonomous yard tractor is more than a preset safety distance value;
search for a candidate space based on a movement position of a crane reference gantry when the loading and unloading safety distance between the autonomous yard tractor and the stationary object is not secured and determine the candidate space as the loading and unloading work position of the autonomous yard tractor as the loading and unloading safety distance between the autonomous yard tractor at the candidate space and the stationary object is secured;
check whether a next candidate space is present when the loading and unloading safety distance between the autonomous yard tractor at the candidate space and the stationary object is not secured; and
suspend a loading and unloading work when the next candidate space is not present.

2. The apparatus of claim 1, wherein coordinates of the occupied space of the autonomous yard tractor in the loading and unloading work position are determined based on the coordinates of the occupied space of the autonomous yard tractor and a longitudinal length of the autonomous yard tractor.

3. The apparatus of claim 2, wherein the coordinates of the occupied space of the loading and unloading work position of the autonomous yard tractor are calculated by adding up the longitudinal length of the autonomous yard tractor, a forward safety margin of the autonomous yard tractor in a lengthwise direction of the autonomous yard tractor and a rear safety margin of the autonomous yard tractor in the lengthwise direction of the autonomous yard tractor.

* * * * *